(12) United States Patent
Roth et al.

(10) Patent No.: US 6,439,516 B1
(45) Date of Patent: Aug. 27, 2002

(54) SUPPORT STRUCTURE HAVING ALTERNATIVE STATES OF HIGH STRENGTH OR LOW THERMAL CONDUCTIVITY, AND CONNECTING STRUT

(75) Inventors: Martin Roth, Taufkirchen; Franz Sperber, Kolbermoor; Adalbert Wagner, Radthal-Wörnsmühl, all of (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/898,673

(22) Filed: Jul. 3, 2001

(30) Foreign Application Priority Data

Jul. 8, 2000 (DE) .......................................... 100 33 397

(51) Int. Cl.⁷ .............................................. A47G 23/02
(52) U.S. Cl. ....................................... 248/146; 248/901
(58) Field of Search ................................ 248/317, 146, 248/901, 550

(56) References Cited

U.S. PATENT DOCUMENTS 2,890,009 A * 6/1959 Chapelleier ................. 248/146
3,768,765 A * 10/1973 Breckenridge, Jr. ......... 248/146
3,814,361 A   6/1974 Gabron et al. .............. 248/146
4,696,169 A * 9/1987 Niemann et al. ............. 62/517
5,379,981 A * 1/1995 Leiderer ..................... 248/550

FOREIGN PATENT DOCUMENTS

EP            0 584 697       2/1996

* cited by examiner

Primary Examiner—Ramon O. Ramirez
Assistant Examiner—Kofi Schulterbrandt
(74) Attorney, Agent, or Firm—Kenyon & Kenyon

(57) ABSTRACT

A support structure includes at least one shaped component which is produced from a shape memory alloy and which, in a first operating state of the support structure, results in an increase in the strength of the support structure and, in a second operating state, results in a reduction in the thermal conductivity of the support structure. The first strut structure is surrounded by a second strut structure, which has a higher mechanical strength in comparison with the first strut structure, and the first strut structure is connected securely, at least at one of its ends, to the second strut structure. In addition, the first strut structure is connected to a holding device, and the second strut structure is releasably connected to the holding device by the at least one shaped component.

18 Claims, 5 Drawing Sheets

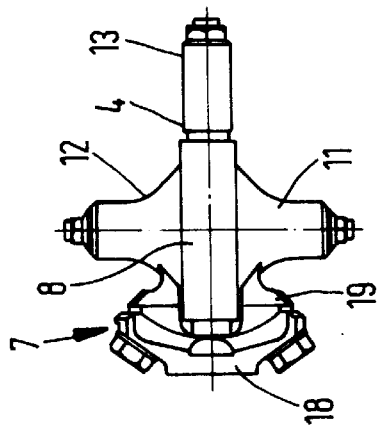
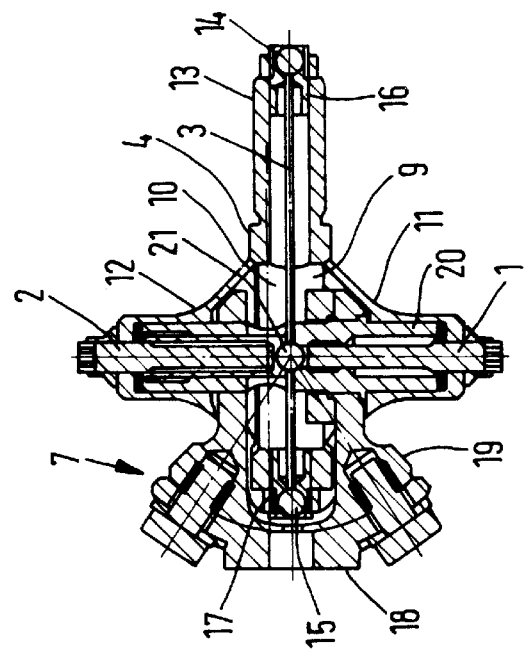
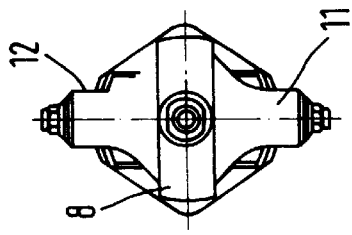
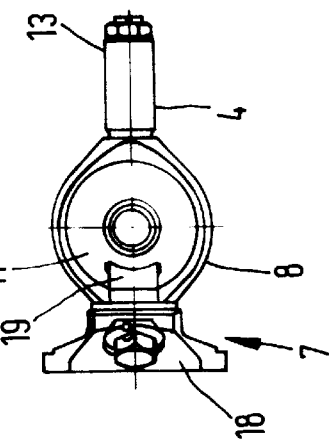

SUPPORT STRUCTURE HAVING ALTERNATIVE STATES OF HIGH STRENGTH OR LOW THERMAL CONDUCTIVITY, AND CONNECTING STRUT

FIELD OF THE INVENTION

The present invention relates to a support structure having alternative states of high strength or low thermal conductivity and to a connecting strut having such a support structure.

BACKGROUND INFORMATION

U.S. Pat. No. 3,814,361 describes a support structure, which includes tubular members that are inserted into one another. Outer, mutually abutting tubular members ensuring a relatively high mechanical strength can be separated as a second strut structure by cooling and then only an inner tubular member, as a first strut structure, carries the mechanical load, the first strut structure remaining connected to the second strut structure and ensuring low thermal conductivity due to a small contact surface relative to one of the tubular members. However, the second strut structure is supported slidingly in the first and therefore only a very limited mechanical strength can be ensured and, for example, the risk of tilting cannot be eliminated.

European Published Patent Application No. 0 584 697 describes another support structure. Shaped components produced from a shape memory alloy are used to separate a support path having a high mechanical strength. Either a support path formed by rings is interrupted by the expansion of a bolt and is partly replaced by a holding device in the form of a spring, or an expansion frame, which serves as a second strut structure and which always remains connected to an object serving as a holding device, is opened and is thus separated from a first strut structure that is in the form of a mechanically less stable strut, on the one end of which the expansion frame acts. The second strut structure is arranged in a plane with and next to the first strut structure, as a result of which only limited stability is ensured.

It is therefore an object of the present invention to provide a support structure having improved stability while still retaining a reduction in the thermal conductivity in one of the operating states. In addition, the support structure may be integrated as simply as possible into existing support structures.

SUMMARY

The support structure according to the present invention includes at least one shaped component which is produced from a shape memory alloy and which, in a first operating state of the support structure, results in an increase in the strength of the support structure and, in a second operating state, results in a reduction in the thermal conductivity of the support structure. A first strut structure is surrounded by a second strut structure which has a higher mechanical strength in comparison with the first strut structure, the arrangement surrounding the first strut structure increasing the stability of the arrangement. Furthermore, the first strut structure is connected securely, at least at its one end, to the second strut structure so that there is some mutual support. The first strut structure is also connected to a holding device, and the second strut structure is releasably connected to the holding device by the at least one shaped component so that the first strut structure has further support. Due to the separation of the second strut structure from the holding device, the thermal conductivity of the entire support structure may be reduced under the control of the at least one shaped component which may be particularly adapted and optimized for that purpose.

For example, the second strut structure may, at least partially, be in the form of a hollow strut, and the first strut structure may be in the form of a strut, one end of which is secured to one end of the second strut structure and the other end of which is secured inside the second strut structure. Thus, in a simple manner, the first strut structure is surrounded by the second strut structure.

It is, however, not necessary for the second strut structure to be in the form of a closed hollow strut over its entire length. For example, the second strut structure may be widened at the end to which the first strut structure is secured, and it may have openings in its outer surface, as a result of which access to the first strut structure may be provided at that region.

For example, the holding device may be connected to the first strut structure through the openings in the second strut structure, and the first strut structure may be connected by the shaped components to coupling members that engage in the openings and produce a non-positive-locking connection between the second strut structure and the holding device.

The shaped components may be in any suitable form that triggers their shape memory effect when the temperature exceeds or falls below a specific threshold temperature and that thereby permits movement of the coupling members. Thus, the coupling members may be moved from a coupling position into a decoupling position. In particular, the shaped components may be in a form such that, when the temperature exceeds or falls below a threshold temperature, longitudinal expansion of the shaped components occurs, and they cause the coupling members to be lifted from the second strut structure.

The other members of the support structure may likewise be in a suitable form. The first strut structure may have a low thermal conductivity with sufficient mechanical strength, and the second strut structure may have a high mechanical strength. For example, the first strut structure may be in the form of a cable. The shaped components may be in the form of bolts or screws connected to the first strut structure. The coupling members may be constructed as lid-like members, the shape of which may be adapted to the shape of the openings in the second strut structure in order to ensure an effective non-positive-locking connection.

In order to achieve sufficient variability of the support structure despite the given mechanical strength thereof, the holding device may be connected rotatably to the first strut structure and, at least in the first operating state, also rotatably to the second strut structure. The ability to rotate may be provided by a hinge-type articulation in one plane only or by a ball-and-socket-type joint. A high degree of mechanical strength is thus retained.

The foregoing support structure may be used in any suitable application. Due to the provision of a mechanically strong operating state and a thermally low-conducting operating state, applications are appropriate wherever a high mechanical strength is to be ensured in a first stage of an arrangement's operation, for example, during a transport stage, and a high degree of thermal insulation is to be achieved in a second stage, for example, during a cooling or heating stage. Therefore, the present invention may be used in a connecting strut for connecting structural members having different temperatures.

BRIEF DESCRIPTION OF THE DRAWINGS

FIGS. 8a to 8d are schematic views of the structure illustrated in FIGS. 1 to 7.

DETAILED DESCRIPTION

Figure 1:
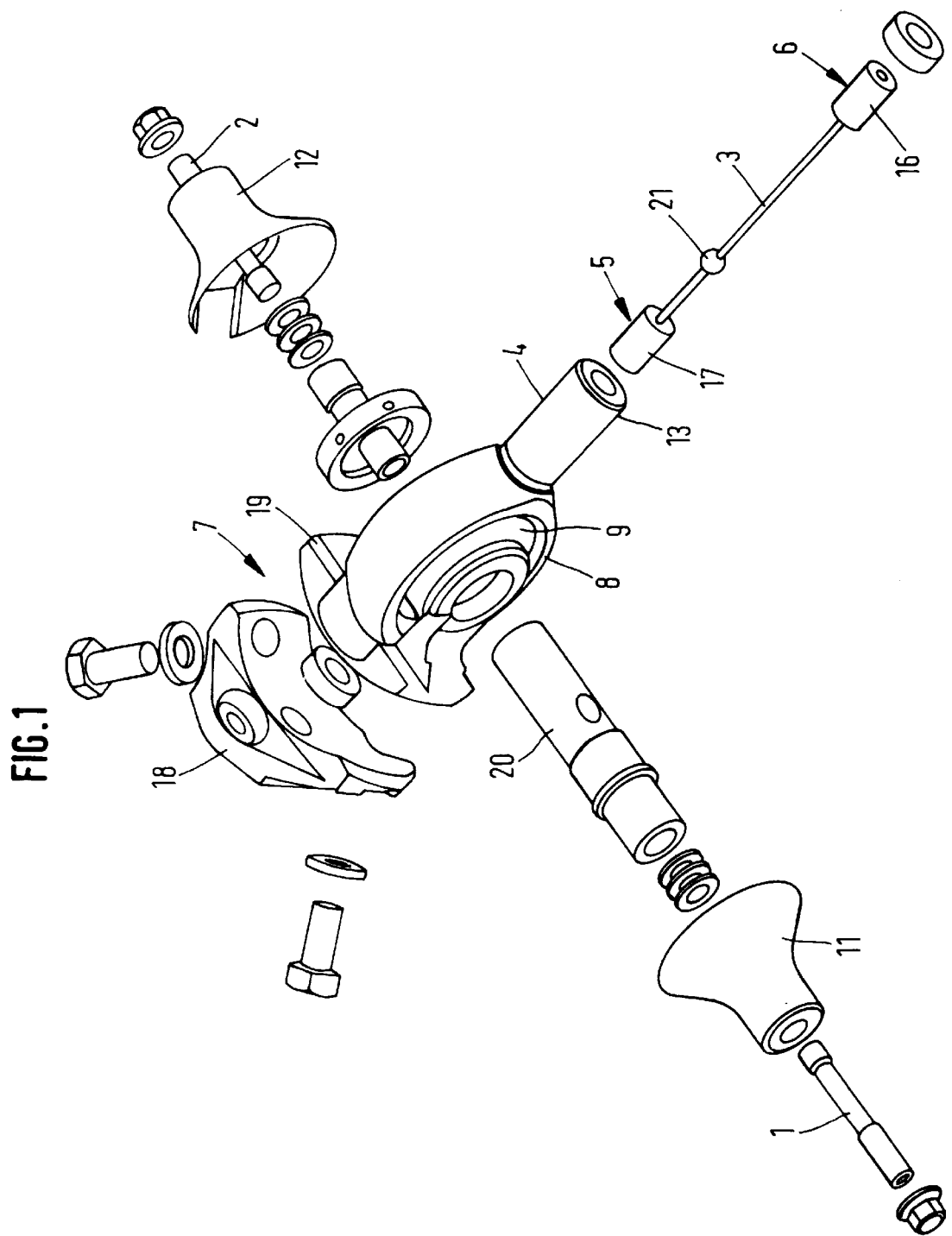
FIG. 1 is an exploded view of an example embodiment of a support structure according to the present invention.

The support structure illustrated in FIG. 1 may be inserted in a simple manner into the eye of a strut or into a recess in another holding member by inserting the one end 13 of the outer strut structure 4, which is partly in the form of a hollow strut, into such an eye or such a recess. The support structure illustrated may therefore be used universally.

Figure 3:
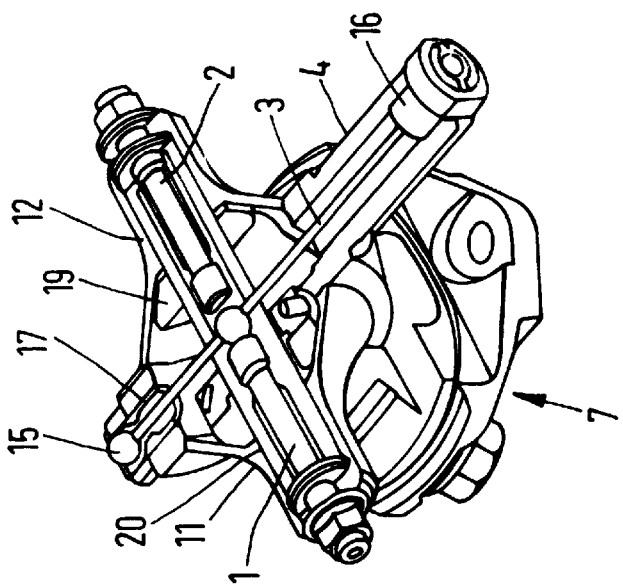
FIG. 3 is another cross-sectional view through the structure illustrated in FIGS. 1 and 2.
Figure 2:
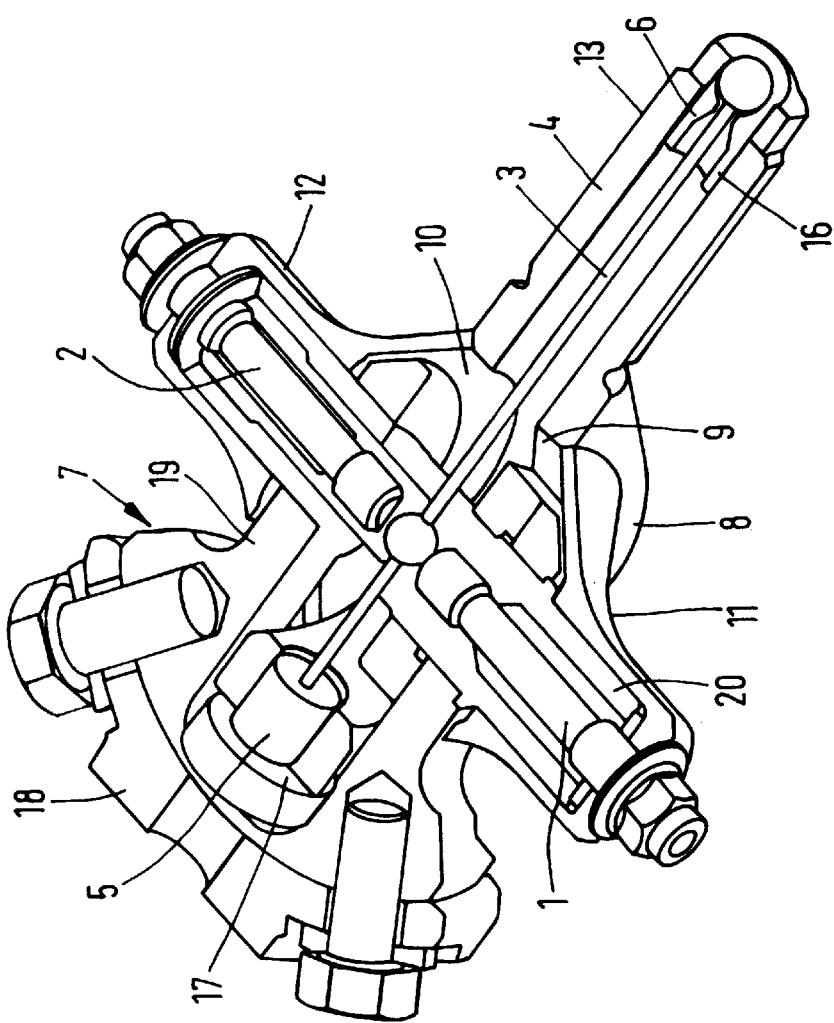
FIG. 2 is a cross-sectional view through the structure illustrated in FIG. 1.
Figure 5:
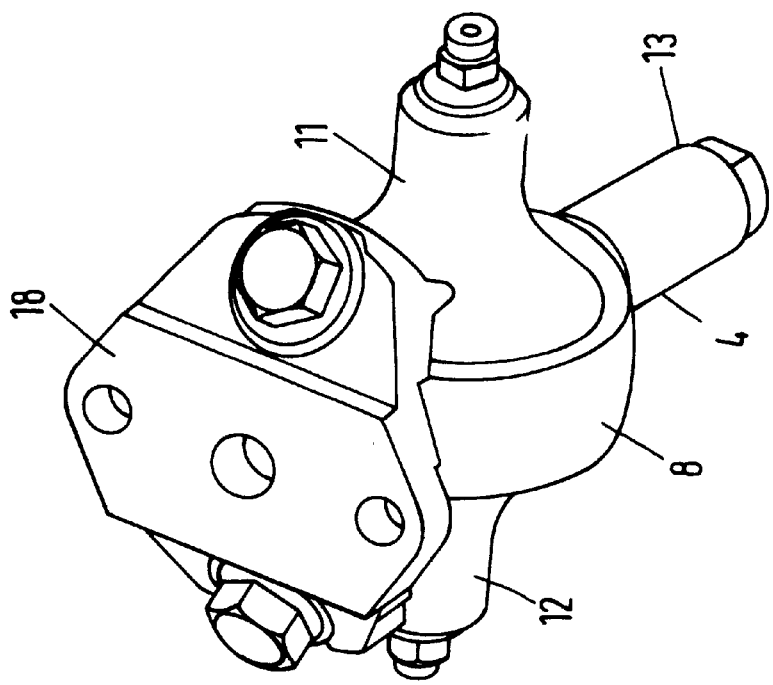
FIG. 5 is a rear view of the structure illustrated in FIG. 4.
Figure 4:
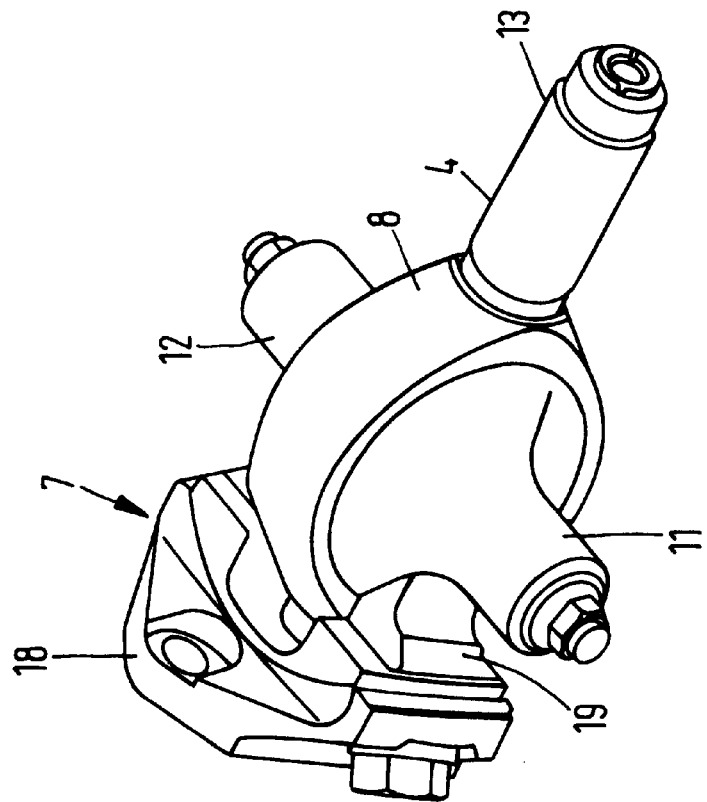
FIG. 4 is a top view of the complete structure illustrated in FIG. 1.

As also illustrated in FIGS. 2 and 3, a first strut structure 3 in the form of a cable is inserted into the second strut structure 4 and includes, at its ends 5, 6, balls which are supported in threaded sleeves 16, 17 which may be pretensioned by nuts against the second strut structure 4. Instead of a cable, it is also possible to use a different thermally low-conducting strut structure, for example by choosing thermally low-conducting materials or an appropriate shaping of the strut structure.

The second strut structure 4 is widened in the region of its second end 8 to form a ring having lateral openings 9, 10. The first strut structure 3 is accessible from outside through those openings 9, 10. It may be connected to a holding device 7 which, in the illustrated example embodiment of the present invention, is formed from a base 18 and a fork 19, which two members may also be in the form of a single structural member. A sleeve 20 through which the cable 3 extends and in which that cable 3 is secured, in the example embodiment of the present invention illustrated in FIG. 1, by a ball 21 provided on the cable, is inserted as a rotatable axis in openings in the fork 19. However, it is also possible to provide for any other kind of securing, such as screwing, adhesive bonding, welding or a suitable positive-locking connection.

Bolts or screws produced from a shape memory alloy are introduced as shaped components 1, 2 into the sleeve 20. If the temperature of the bolts or screws falls below a threshold temperature $T_s$, for example $T_s=0°$ C., they undergo a conversion from a first state (austenite) into a second state (martensite), in conjunction with a change in shape, in the example embodiment of the present invention, in conjunction with a change in length. The shaped components 1, 2 expand in the longitudinal direction. As a result, covers 11, 12, which may be conical and which may be connected to the shaped components, are lifted from the openings 9, 10 in the second strut structure 4. The holding device 7 is thus separated from the second strut structure 4 and the load path passes only by way of the holding device 7, the sleeve 20, the first strut structure 3 and the one end 13 of the second strut structure 4.

If the threshold temperature $T_s$ is exceeded, the reverse conversion takes place, so that the shaped components 1, 2 contract and the covers 11, 12 are therefore pressed onto the openings 9, 10, as illustrated in FIGS. 2 to 7. The load path therefore additionally passes by way of the holding device 7, the sleeve 20, the covers 11, 12 and the other end 8 of the second strut structure 4 to the aforementioned end 13 of the second strut structure 4.

Figure 7:
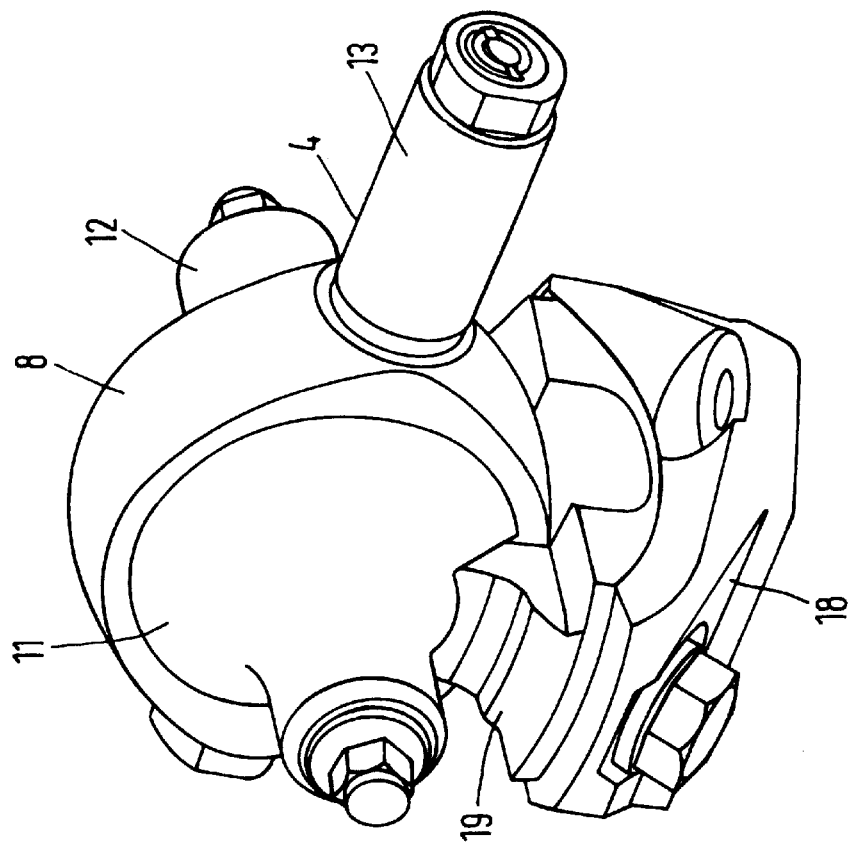
FIGS. 6 and 7 are additional views of the structure illustrated in FIG. 4.
Figure 6:
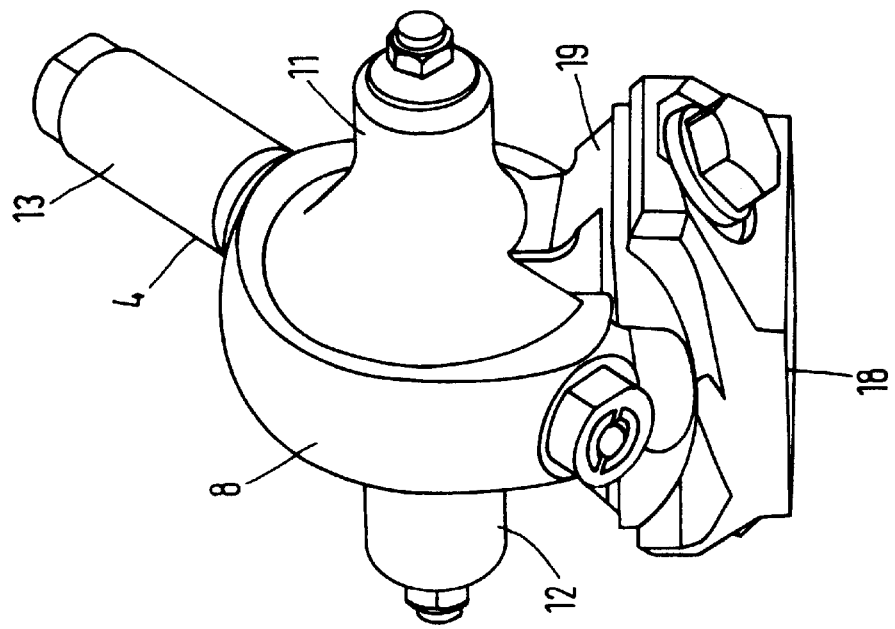

As illustrated in FIGS. 3, 6 and 7, the holding device 7 and the assembly including the first strut structure 3 and the second strut structure 4 may be rotated relative to one another, rotation occurring about the sleeve 20 which is rotatably supported in the fork 19. That permits greater freedom in the arrangement and therefore in the application of the present invention, while still retaining the mechanical strength.

The present invention may be used wherever the temperature on the side where the holding device 7 is arranged differs from the temperature on the side where the end 13 of the second strut structure 4 is arranged, which end may be connected to a further strut, holding device or another structural member. The present invention may be used, for example, as a transport and operation holding device for cooling or heating equipment, cooling tanks, engines, etc. For example, for a space application, during the lift-off phase and the landing phase of a spacecraft, high mechanical strength may be achieved for the storage of cryogenic equipment which may be released in a working phase in space, whereby thermal isolation of the cryogenic equipment from the equipment on the other side of the support structure according to the invention may be substantially effected.

What is claimed is:

1. A support structure, comprising:

at least one shaped component formed of a shape memory alloy, the at least one shaped component being configured to increase a strength of the support structure in a first operating state thereof and to reduce a thermal conductivity of the support structure in a second operating state thereof;

a first strut structure;

a second strut structure surrounding the first strut structure, the second strut structure having a higher mechanical strength than the first strut structure, the first strut structure being securely connected at least at one end to the second strut structure; and a holding device, the first strut structure being connected to the holding device, the second strut structure being releasably connected to the holding device by the at least one shaped component.

2. The support structure according to claim 1, wherein the second strut structure is at least partially in the form of a hollow strut and the first strut structure is in the form of a strut, a first end of the first strut structure being connected to a first end of the second strut structure, a second end of the first strut structure being secured inside the second strut structure.

3. The support structure according to claim 2, wherein the second strut structure is widened at the first end and includes openings in an outer surface.

4. The support structure according to claim 3, wherein the holding device is connected to the first strut structure through the openings, the first strut structure being connected to coupling members by the at least one shaped component, the coupling members engaging the openings and providing a non-positive-locking connection between the second strut structure and the holding device.

5. The support structure according to claim 4, wherein the at least one shaped component is configured to longitudinally expand and cause the coupling member to be lifted from the second strut structure when a temperature one of exceeds and falls below a threshold temperature.

6. The support structure according to claim 1, wherein the first strut structure includes a cable.

7. The support structure according to claim 1, wherein the at least one shaped component is in the form of one of a bolt and a screw connected to the first strut structure.

8. The support structure according to claim 4, wherein the coupling members are in the form of a lid member.

9. The support structure according to claim 1, wherein the holding device connected rotatably to the first strut structure, and wherein the holding device is rotatably connected to the second strut structure at least in the first operating state.

10. A connecting strut for connecting structural members having different temperatures, comprising:

a support structure, the support structure including:
at least one shaped component formed of a shape memory alloy, the at least one shaped component being configured to increase a strength of the support structure in a first operating state thereof and to reduce a thermal conductivity of the support structure in a second operating state thereof;
a first strut structure;
a second strut structure surrounding the first strut structure, the second strut structure having a higher mechanical strength than the first strut structure, the first strut structure being securely connected at least at one end to the second strut structure; and
a holding device, the first strut structure being connected to the holding device, the second strut structure being releasably connected to the holding device by the at least one shaped component.

11. The connecting strut according to claim 10, wherein the second strut structure is at least partially in the form of a hollow strut and the first strut structure is in the form of a strut, a first end of the first strut structure being connected to a first end of the second strut structure, a second end of the first strut structure being secured inside the second strut structure.

12. The connecting strut according to claim 11, wherein the second strut structure is widened at the first end and includes openings in an outer surface.

13. The connecting strut according to claim 12, wherein the holding device is connected to the first strut structure through the openings, the first strut structure being connected to coupling members by the at least one shaped component, the coupling members engaging the openings and providing a non-positive-locking connection between the second strut structure and the holding device.

14. The connecting strut according to claim 13, wherein the at least one shaped component is configured to longitudinally expand and cause the coupling member to be lifted from the second strut structure when a temperature one of exceeds and falls below a threshold temperature.

15. The connecting strut according to claim 10, wherein the first strut structure includes a cable.

16. The connecting strut according to claim 10, wherein the at least one shaped component is in the form of one of a bolt and a screw connected to the first strut structure.

17. The connecting strut according to claim 13, wherein the coupling members are in the form of a lid member.

18. The connecting strut according to claim 10, wherein the holding device connected rotatably to the first strut structure, and wherein the holding device is rotatably connected to the second strut structure at least in the first operating state.

* * * * *